(12) United States Patent
Vijayasankar et al.

(10) Patent No.: US 8,787,195 B2
(45) Date of Patent: Jul. 22, 2014

(54) BEACON SELECTION IN COMMUNICATION NETWORKS

(75) Inventors: Kumaran Vijayasankar, Dallas, TX (US); Ramanuja Vedantham, Allen, TX (US); Robert Liang, Frisco, TX (US); Susan Yim, Plano, TX (US); Xiaolin Lu, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 137 days.

(21) Appl. No.: 13/531,324

(22) Filed: Jun. 22, 2012

(65) Prior Publication Data

US 2012/0294377 A1 Nov. 22, 2012

Related U.S. Application Data

(60) Provisional application No. 61/502,375, filed on Jun. 29, 2011, provisional application No. 61/502,648, filed on Jun. 29, 2011.

(51) Int. Cl.
*H04L 12/26* (2006.01)

(52) U.S. Cl.
USPC ............................................. 370/252; 370/254

(58) Field of Classification Search
None
See application file for complete search history.

(56) References Cited

U.S. PATENT DOCUMENTS

| | | | |
|---|---|---|---|
| 7,233,991 B2 * | 6/2007 | Adhikari | 709/224 |
| 2006/0250954 A1 * | 11/2006 | Mulrane et al. | 370/229 |
| 2007/0076595 A1 | 4/2007 | Lee et al. | |
| 2007/0230331 A1 | 10/2007 | Lee et al. | |

* cited by examiner

*Primary Examiner* — Alex Skripnikov
(74) *Attorney, Agent, or Firm* — Steven A. Shaw; Frederick J. Telecky, Jr.

(57) ABSTRACT

Systems and methods for beacon selection in communication networks are described. In various implementations, these systems and methods may be applicable to Power Line Communications (PLC). For example, a method may include performing, using a terminal device deployed in a communications network, receiving a beacon transmitted by a switch device within the communications network and, in response to the terminal device having had a previous connection with the switch device, determining a connection time of the previous connection. The method may also include performing at least one of: adding the switch device to a blacklist in response to the connection time being smaller than a first threshold value, or selecting the switch device for subsequent communication in response to the connection time being greater than a second threshold value.

19 Claims, 6 Drawing Sheets

BEACON SELECTION IN COMMUNICATION NETWORKS

CROSS-REFERENCE TO RELATED APPLICATIONS

This application claims the benefit of the filing date of U.S. Provisional Patent Application No. 61/502,375 titled "PRIME—Level and Connection Time Based Beacon Selection Algorithm" and of U.S. Provisional Patent Application No. 61/502,648 titled "PRIME—Beacon Selection Algorithm (BCN-QLTY)," both filed Jun. 29, 2011, the disclosures of which are hereby incorporated by reference herein in their entirety.

TECHNICAL FIELD

This specification is directed, in general, to network communications, and, more specifically, to systems and methods for beacon selection in communication networks.

BACKGROUND

There are several different types of communication networks available today. For example, power line communications (PLC) include systems for communicating data over the same medium (i.e., a wire or conductor) that is also used to transmit electric power to residences, buildings, and other premises. Once deployed, PLC systems may enable a wide array of applications, including, for example, automatic meter reading and load control (i.e., utility-type applications), automotive uses (e.g., charging electric cars), home automation (e.g., controlling appliances, lights, etc.), and/or computer networking (e.g., Internet access), to name only a few.

For each different type of communications network, different standardizing efforts are commonly undertaken throughout the world. For instance, in the case of PLC communications may be implemented differently depending upon local regulations, characteristics of local power grids, etc. Examples of competing PLC standards include the IEEE 1901, HomePlug AV, and ITU-T G.hn (e.g., G.9960 and G.9961) specifications. Another PLC standardization effort includes, for example, the Powerline-Related Intelligent Metering Evolution (PRIME) standard designed for OFDM-based (Orthogonal Frequency-Division Multiplexing) communications.

SUMMARY

Systems and methods for beacon selection in network communications are described. In an illustrative, non-limiting embodiment, a method may include performing one or more operations using a terminal device deployed in a communications network. For example, the method may include receiving a beacon transmitted by a switch device within the communications network and, in response to the terminal device having had a previous connection with the switch device, determining a connection time of the previous connection. The method may also include performing at least one of: adding the switch device to a blacklist in response to the connection time being smaller than a first threshold value, or selecting the switch device for subsequent communication in response to the connection time being greater than a second threshold value.

In some implementations, the communications network may be a Power Line Communications (PLC) network. The method may also include determining that the previous connection was terminated due to channel conditions (e.g., a loss of beacon event, a timeout event, etc.) and/or determining that the previous connection was terminated due to another event other than a disconnect command.

In response to the connection time being between the first and second threshold values, the method may include determining a signal quality indicator of the beacon and performing at least one of storing an entry corresponding to the beacon in a first portion of a preferences list in response to the signal quality indicator being greater than a signal quality threshold value, or storing an entry corresponding to the beacon in a second portion of the preferences list in response to the signal quality indicator being smaller than the signal quality threshold value. For instance, the signal quality indicator may be a Signal-to-Noise (SNR) ratio.

In some embodiments, the first portion of the preferences list may include entries corresponding to other beacons transmitted by other switch devices within the communications network, the entries ordered according to their respective beacon's signal level. Additionally or alternatively, the first portion of the preferences list may include entries corresponding to other beacons transmitted by other switch devices within the communications network, the entries ordered according to a physical distance between the terminal device and each switch device corresponding to a respective entry. Moreover, the second portion of the preferences list may include entries corresponding to other beacons transmitted by other switch devices within the communications network, the entries ordered by their respective beacon's signal quality indicators. The method may then include selecting one of a plurality of switch devices for a subsequent communication based upon a plurality of ordered entries in the first portion of the preferences list and/or selecting one of a plurality of switch devices for a subsequent communication based upon a plurality of ordered entries in the second portion of the preferences list in response to no entries being stored in the first portion of the preferences list.

In other embodiments, the method may include determining a signal quality indicator of the beacon in response to the connection time being between the first and second threshold values and performing at least one of: storing an entry corresponding to the beacon in a last portion of a preferences list in response to the signal quality indicator being smaller than the signal quality threshold value, each of the entries in the last portion of the preferences list ordered by their respective signal quality indicators, or determining a beacon quality index for the beacon and storing an entry corresponding to the beacon in an $n^{th}$ portion of the preferences list in response to the beacon quality index being greater than or equal to an $n^{th}$ predetermined value, each of the n portions of the preferences list having their entries ordered by their respective signal levels, where n is an integer greater than 1.

In some implementations, determining the beacon quality index may include determining an end-to-end probability of success in communications between the terminal device and the switch device, and mapping the calculated end-to-end probability of success to one of a plurality of possible beacon quality indexes. In other implementations, the method may include selecting one of a plurality of switch devices for a subsequent communication by sequentially inspecting one or more of the portions of the preferences list.

In another illustrative, non-limiting embodiment, a system may include a communications device having a processor and a memory coupled to the processor, the memory configured to store program instructions executable by the processor to cause the communications device to perform one or more operations. For example, the communications device may identify a beacon associated with a switch node in a communications network and, in response to the communications device having had a previous connection with the switch node, determine a connection time of the previous connection. The communications device may also determine a signal quality indicator of the beacon in response to the connection time being between a first threshold value and a second threshold value, store an entry corresponding to the beacon in a first portion of a preferences list in response to the signal quality indicator being greater than a signal quality threshold value, and store an entry corresponding to the beacon in a second portion of the preferences list in response to the signal quality indicator being smaller than the signal quality threshold value.

In yet another illustrative, non-limiting embodiment, a non-transitory electronic storage medium may include program instructions stored thereon that, upon execution by a processor within a communications device, cause the communications device to identify a beacon associated with a switch node in a communications network and, in response to the communications device having had a previous connection with the switch node, determine a connection time of the previous connection. The communications device may also determine a signal quality indicator of the beacon in response to the connection time being between a first threshold value and a second threshold value, store an entry corresponding to the beacon in a last portion of a preferences list in response to the signal quality indicator being smaller than the signal quality threshold value, each of the entries in the last portion of the preferences list ordered by their respective signal quality indicators, and determine a beacon quality index for the beacon and storing an entry corresponding to the beacon in an $n^{th}$ portion of the preferences list in response to the beacon quality index being greater than or equal to an $n^{th}$ predetermined value, each of the n portions of the preferences list having their entries ordered by their respective signal levels, wherein n is an integer greater than 1.

In some embodiments, one or more communication devices or computer systems may perform one or more of the techniques described herein. In other embodiments, a tangible computer-readable or electronic storage medium may have program instructions stored thereon that, upon execution by one or more communication devices or computer systems, cause the one or more communication devices or computer systems to execute one or more operations disclosed herein. In yet other embodiments, a communication system (e.g., a device or modem) may include at least one processor and a memory coupled to the at least one processor. Examples of a processor include, but are not limited to, a digital signal processor (DSP), an application specific integrated circuit (ASIC), a system-on-chip (SoC) circuit, a field-programmable gate array (FPGA), a microprocessor, or a microcontroller. The memory may be configured to store program instructions executable by the at least one processor to cause the system to execute one or more operations disclosed herein.

BRIEF DESCRIPTION OF THE DRAWINGS

Figure 1:
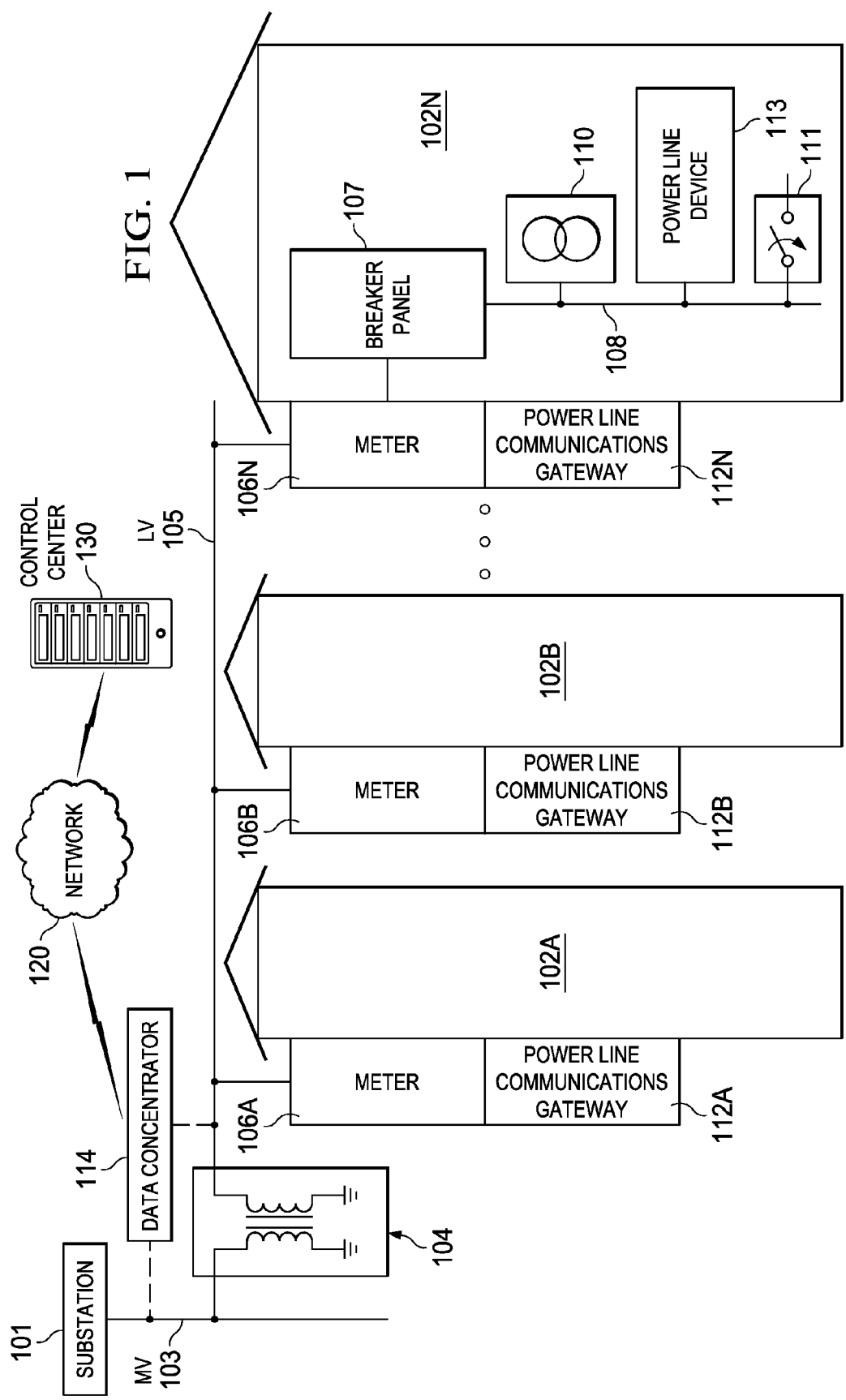

Having thus described the invention(s) in general terms, reference will now be made to the accompanying drawings, wherein:

FIG. 1 is a block diagram of a power line communication (PLC) environment according to some embodiments.

Figure 2:
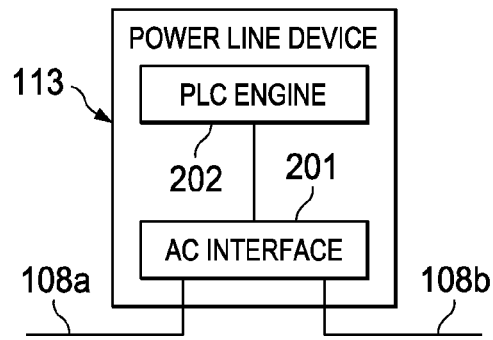

FIG. 2 is a block diagram of a PLC device or modem according to some embodiments.

Figure 3:
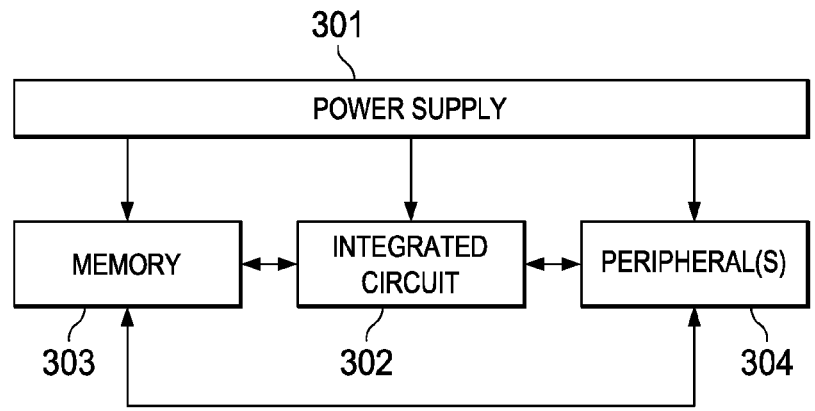

FIG. 3 is a block diagram of an integrated circuit according to some embodiments.

Figure 4:
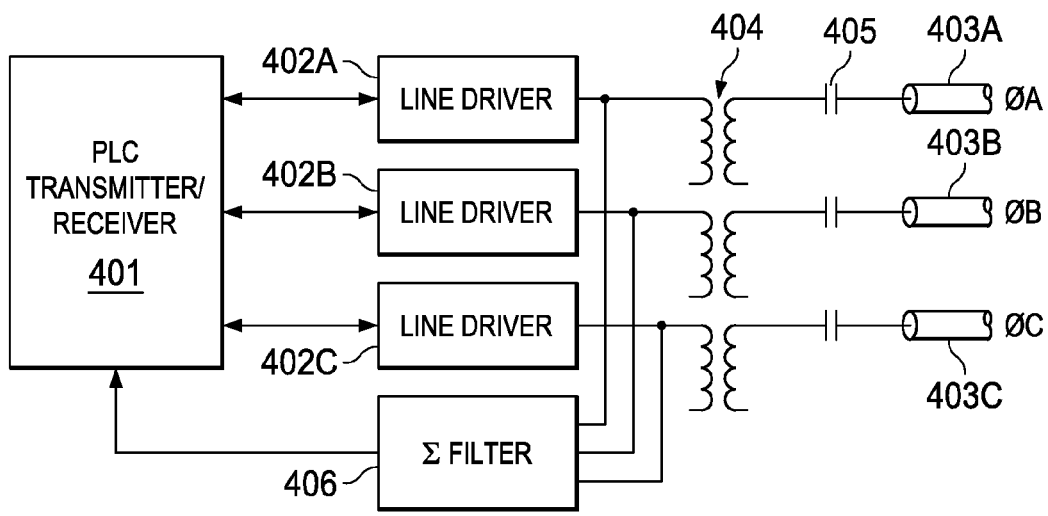
Figure 5:
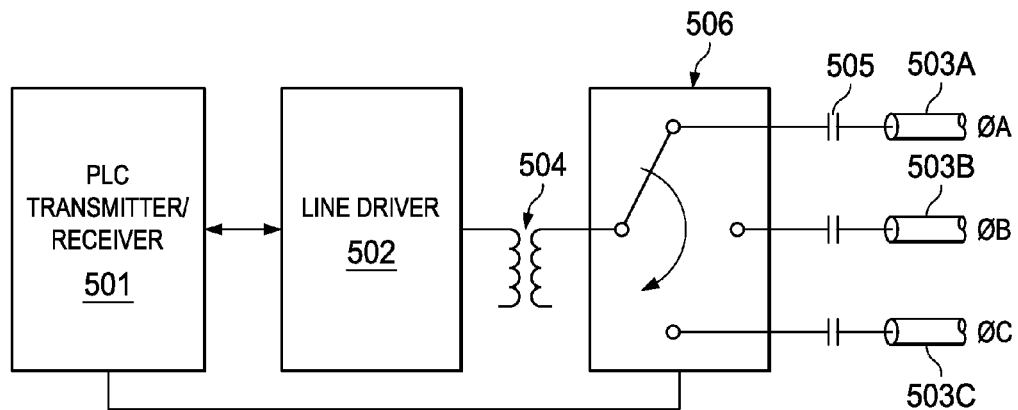
Figure 6:
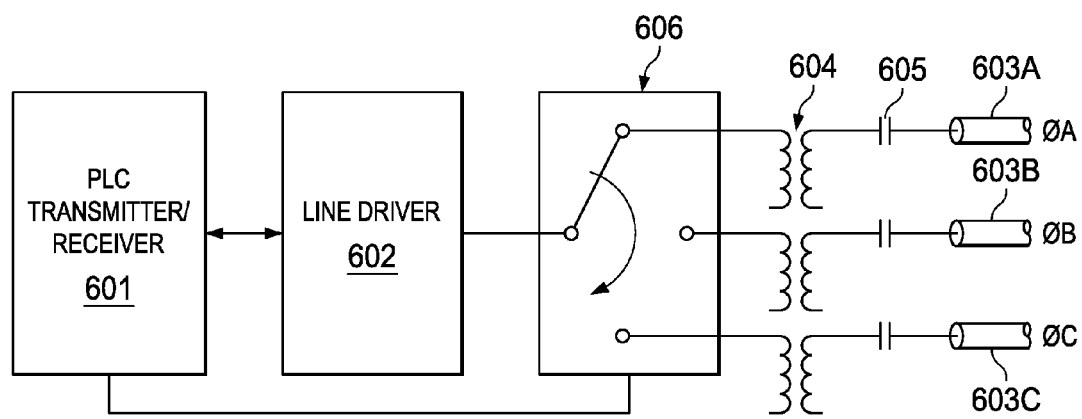

FIGS. 4-6 are block diagrams illustrating connections between a PLC transmitter and/or receiver circuitry to three-phase power lines according to some embodiments.

Figure 7:
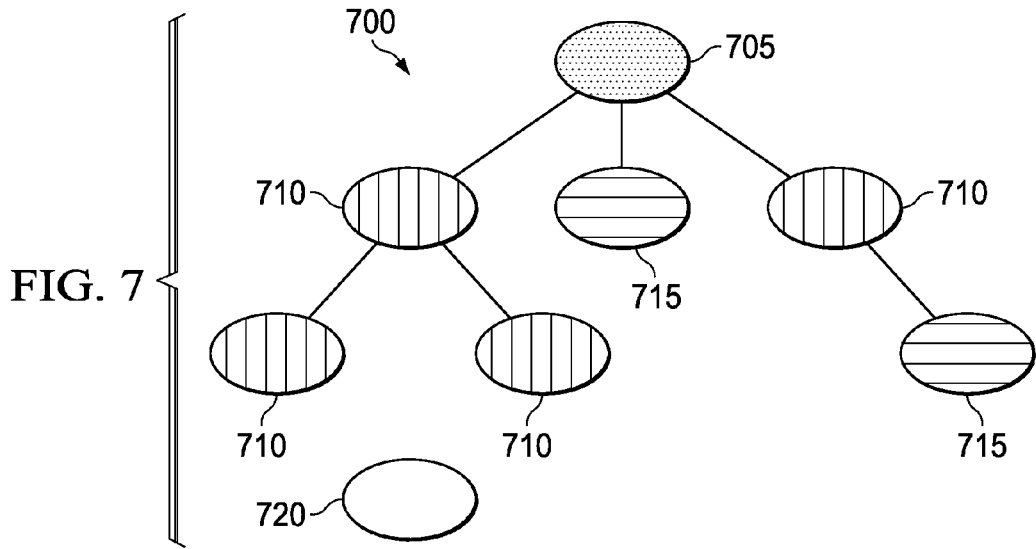

FIG. 7 is a block diagram of nodes in a PLC network following the PRIME standard according to some embodiments.

Figure 8:
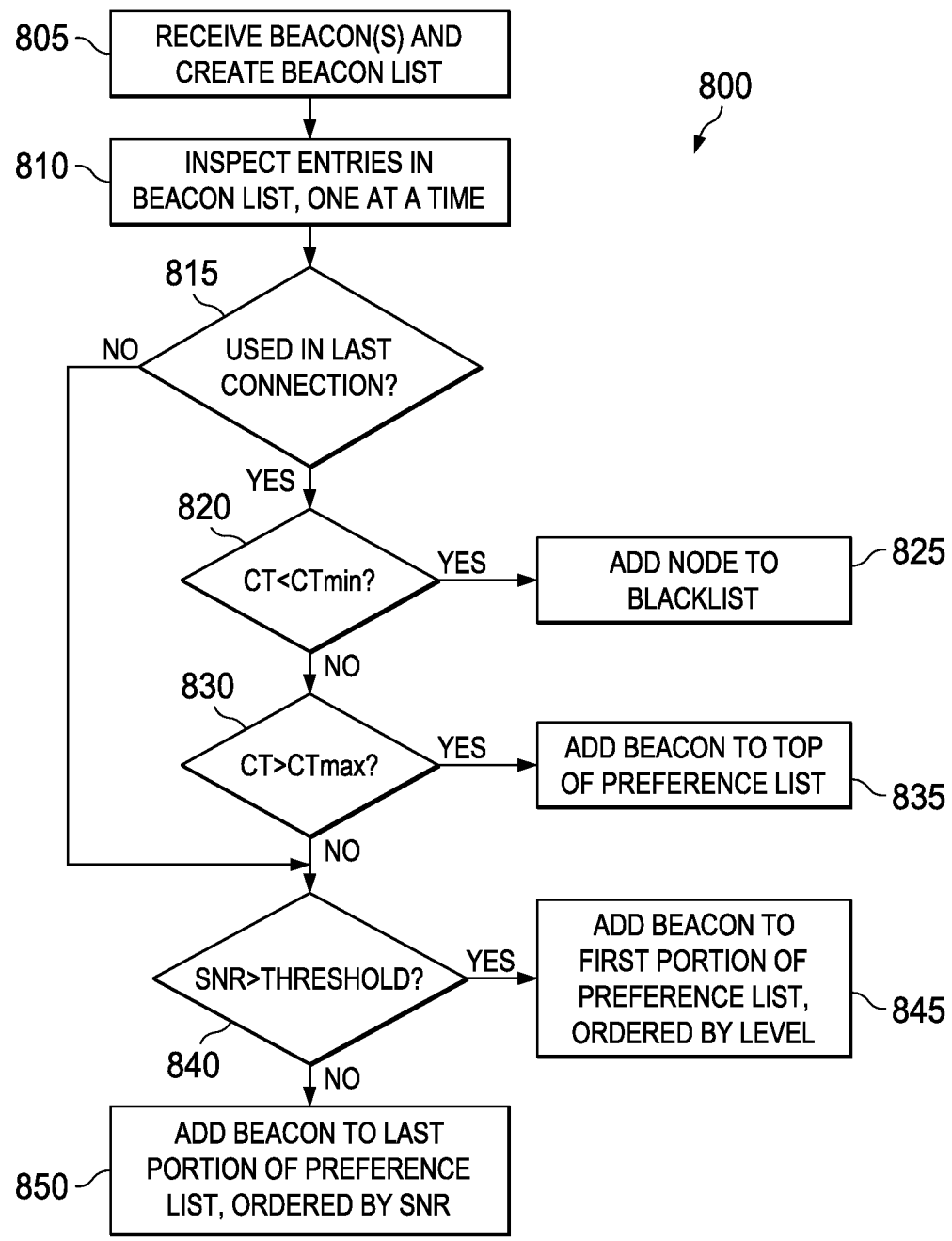

FIG. 8 is a flowchart of a method of selecting beacons in a communications network according to some embodiments.

Figure 9:
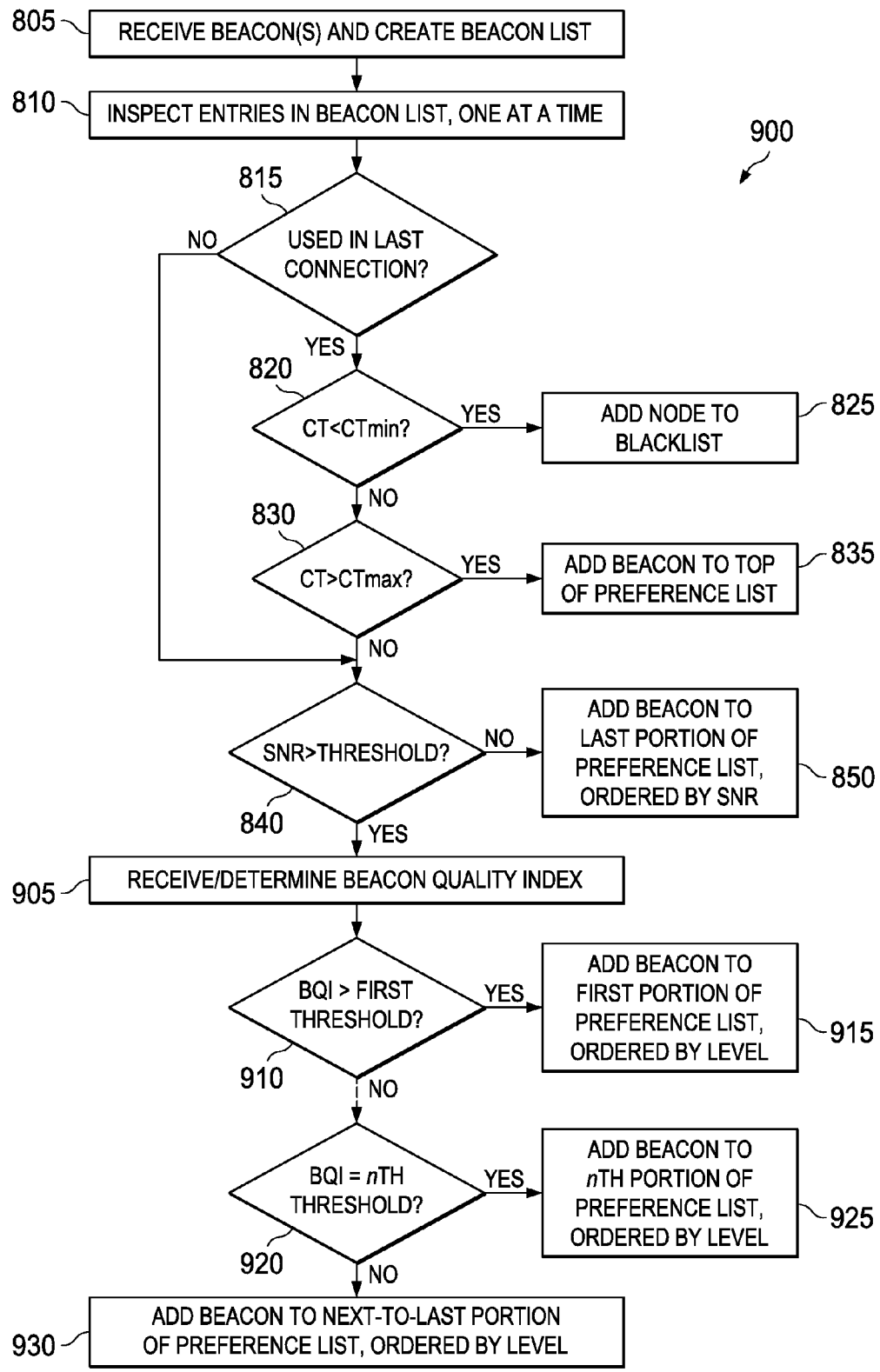

FIG. 9 is a flowchart of another method of selecting beacons in a communications network according to some embodiments.

Figure 10:
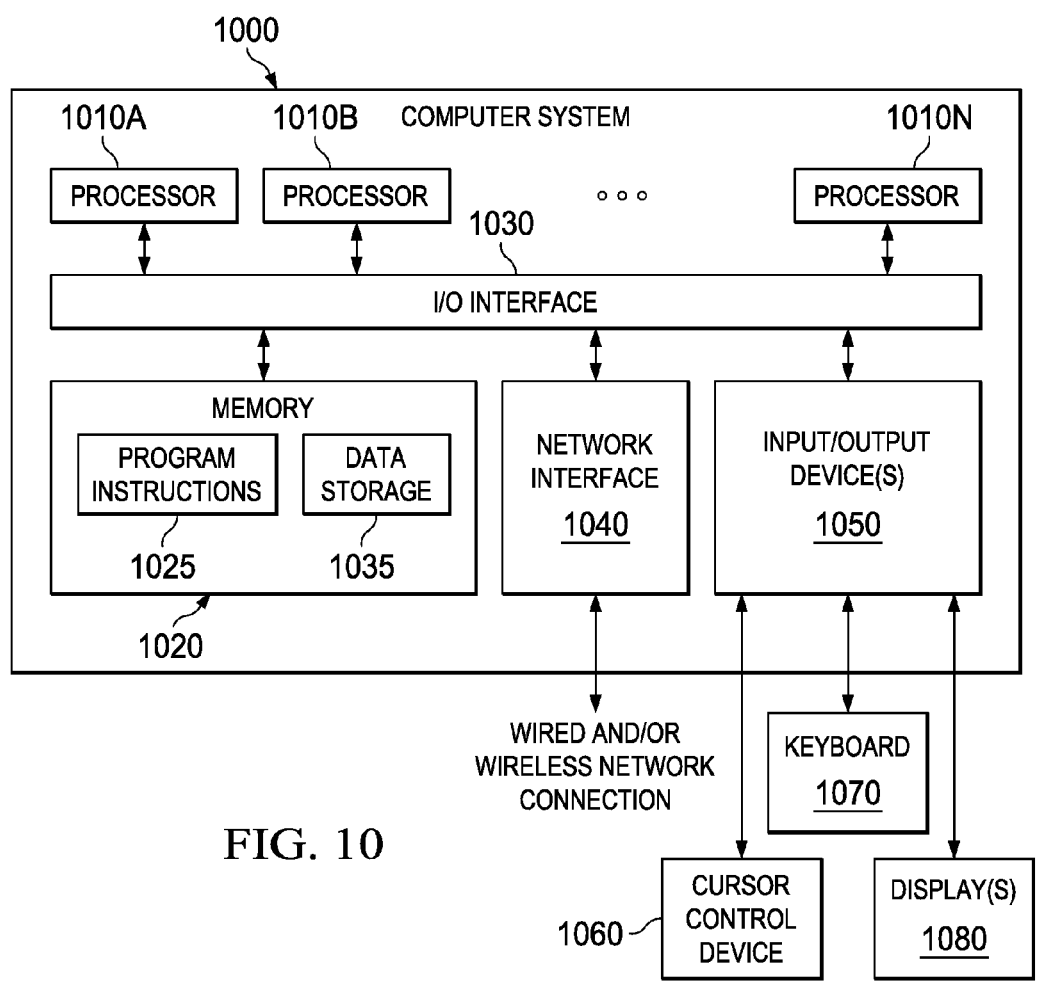

FIG. 10 is a block diagram of a computing system configured to implement certain systems and methods described herein according to some embodiments.

DETAILED DESCRIPTION

The invention(s) now will be described more fully hereinafter with reference to the accompanying drawings. The invention(s) may, however, be embodied in many different forms and should not be construed as limited to the embodiments set forth herein. Rather, these embodiments are provided so that this disclosure will be thorough and complete, and will fully convey the scope of the invention(s) to a person of ordinary skill in the art. A person of ordinary skill in the art may be able to use the various embodiments of the invention(s).

In various embodiments, the systems and methods described herein may be used to select beacons in communications networks. Generally speaking, these systems and methods may be applicable to a wide variety of communication environments, including, but not limited to, those involving wireless communications (e.g., cellular, Wi-Fi, WiMax, etc.), wired communications (e.g., Ethernet, etc.), power line communications (PLC), or the like. For ease of explanation, several examples discussed below are described specifically in the context of PLC. As a person of ordinary skill in the art will recognize in light of this disclosure, however, certain techniques and principles disclosed herein may also be applicable to other communication environments.

Turning now to FIG. 1, an electric power distribution system is depicted according to some embodiments. Medium voltage (MV) power lines 103 from substation 101 typically carry voltage in the tens of kilovolts range. Transformer 104 steps the MV power down to low voltage (LV) power on LV lines 105, carrying voltage in the range of 100-240 VAC. Transformer 104 is typically designed to operate at very low frequencies in the range of 50-60 Hz. Transformer 104 does not typically allow high frequencies, such as signals greater than 100 KHz, to pass between LV lines 105 and MV lines 103. LV lines 105 feed power to customers via meters 106a-n, which are typically mounted on the outside of residences 102a-n. (Although referred to as "residences," premises 102a-n may include any type of building, facility or location where electric power is received and/or consumed.) A breaker panel, such as panel 107, provides an interface between meter 106n and electrical wires 108 within residence 102n. Electrical wires 108 deliver power to outlets 110, switches 111 and other electric devices within residence 102n.

The power line topology illustrated in FIG. 1 may be used to deliver high-speed communications to residences 102a-n. In some implementations, power line communications modems or gateways 112a-n may be coupled to LV power lines 105 at meter 106a-n. PLC modems/gateways 112a-n may be used to transmit and receive data signals over MV/LV lines 103/105. Such data signals may be used to support metering and power delivery applications (e.g., smart grid applications), communication systems, high speed Internet, telephony, video conferencing, and video delivery, to name a few. By transporting telecommunications and/or data signals over a power transmission network, there is no need to install new cabling to each subscriber 102a-n. Thus, by using existing electricity distribution systems to carry data signals, significant cost savings are possible.

An illustrative method for transmitting data over power lines may use, for example, a carrier signal having a frequency different from that of the power signal. The carrier signal may be modulated by the data, for example, using an orthogonal frequency division multiplexing (OFDM) scheme or the like.

PLC modems or gateways 112a-n at residences 102a-n use the MV/LV power grid to carry data signals to and from PLC data concentrator 114 without requiring additional wiring. Concentrator 114 may be coupled to either MV line 103 or LV line 105. Modems or gateways 112a-n may support applications such as high-speed broadband Internet links, narrowband control applications, low bandwidth data collection applications, or the like. In a home environment, for example, modems or gateways 112a-n may further enable home and building automation in heat and air conditioning, lighting, and security. Also, PLC modems or gateways 112a-n may enable AC or DC charging of electric vehicles and other appliances. An example of an AC or DC charger is illustrated as PLC device 113. Outside the premises, power line communication networks may provide street lighting control and remote power meter data collection.

One or more data concentrators 114 may be coupled to control center 130 (e.g., a utility company) via network 120. Network 120 may include, for example, an IP-based network, the Internet, a cellular network, a WiFi network, a WiMax network, or the like. As such, control center 130 may be configured to collect power consumption and other types of relevant information from gateway(s) 112 and/or device(s) 113 through concentrator(s) 114. Additionally or alternatively, control center 130 may be configured to implement smart grid policies and other regulatory or commercial rules by communicating such rules to each gateway(s) 112 and/or device(s) 113 through concentrator(s) 114.

In some embodiments, each concentrator 114 may be seen as a base node for a PLC domain, each such domain comprising downstream PLC devices that communicate with control center 130 through a respective concentrator 114. For example, in FIG. 1, device 106a-n, 112a-n, and 113 may all be considered part of the PLC domain that has data concentrator 114 as its base node; although in other scenarios other devices may be used as the base node of a PLC domain. In a typical situation, multiple nodes may be deployed in a given PLC network, and at least a subset of those nodes may be tied to a common clock through a backbone (e.g., Ethernet, digital subscriber loop (DSL), etc.). Further, each PLC domain may be coupled to MV line 103 through its own distinct transformer similar to transformer 104.

Still referring to FIG. 1, meter 106, gateways 112, PLC device 113, and data concentrator 114 may each be coupled to or otherwise include a PLC modem or the like. The PLC modem may include transmitter and/or receiver circuitry to facilitate the device's connection to power lines 103, 105, and/or 108.

FIG. 2 is a block diagram of PLC device or modem 113 according to some embodiments. As illustrated, AC interface 201 may be coupled to electrical wires 108a and 108b inside of premises 112n in a manner that allows PLC device 113 to switch the connection between wires 108a and 108b off using a switching circuit or the like. In other embodiments, however, AC interface 201 may be connected to a single wire 108 (i.e., without breaking wire 108 into wires 108a and 108b) and without providing such switching capabilities. In operation, AC interface 201 may allow PLC engine 202 to receive and transmit PLC signals over wires 108a-b. As noted above, in some cases, PLC device 113 may be a PLC modem. Additionally or alternatively, PLC device 113 may be a part of a smart grid device (e.g., an AC or DC charger, a meter, etc.), an appliance, or a control module for other electrical elements located inside or outside of premises 112n (e.g., street lighting, etc.).

PLC engine 202 may be configured to transmit and/or receive PLC signals over wires 108a and/or 108b via AC interface 201 using a particular channel or frequency band. In some embodiments, PLC engine 202 may be configured to transmit OFDM signals, although other types of modulation schemes may be used. As such, PLC engine 202 may include or otherwise be configured to communicate with metrology or monitoring circuits (not shown) that are in turn configured to measure power consumption characteristics of certain devices or appliances via wires 108, 108a, and/or 108b. PLC engine 202 may receive such power consumption information, encode it as one or more PLC signals, and transmit it over wires 108, 108a, and/or 108b to higher-level PLC devices (e.g., PLC gateways 112n, data concentrators 114, etc.) for further processing. Conversely, PLC engine 202 may receive instructions and/or other information from such higher-level PLC devices encoded in PLC signals, for example, to allow PLC engine 202 to select a particular frequency band in which to operate.

In various embodiments, PLC device 113 may be implemented at least in part as an integrated circuit. FIG. 3 is a block diagram of such an integrated circuit. In some cases, one or more of meter 106, gateway 112, PLC device 113, or data concentrator 114 may be implemented similarly as shown in FIG. 3. For example, integrated circuit 302 may be a digital signal processor (DSP), an application specific integrated circuit (ASIC), a system-on-chip (SoC) circuit, a field-programmable gate array (FPGA), a microprocessor, a microcontroller, or the like. As such, integrated circuit 302 may implement, at least in part, at least a portion of PLC engine 202 shown in FIG. 2. Integrated circuit 302 is coupled to one or more peripherals 304 and external memory 303. Further, integrated circuit 302 may include a driver for communicating signals to external memory 303 and another driver for communicating signals to peripherals 304. Power supply 301 is also provided which supplies the supply voltages to integrated circuit 302 as well as one or more supply voltages to memory 303 and/or peripherals 304. In some embodiments, more than one instance of integrated circuit 302 may be included (and more than one external memory 303 may be included as well).

Peripherals 304 may include any desired circuitry, depending on the type of PLC device or system. For example, in some embodiments, peripherals 304 may implement, at least in part, at least a portion of a PLC modem (e.g., portions of AC interface 210 shown in FIG. 2). Peripherals 304 may also include additional storage, including RAM storage, solid-state storage, or disk storage. In some cases, peripherals 304 may include user interface devices such as a display screen, including touch display screens or multi-touch display screens, keyboard or other input devices, microphones, speakers, etc. External memory 303 may include any type of memory. For example, external memory 303 may include SRAM, nonvolatile RAM (NVRAM, such as "flash"

memory), and/or dynamic RAM (DRAM) such as synchronous DRAM (SDRAM), double data rate (DDR, DDR2, DDR3, etc.) SDRAM, etc. External memory 303 may include one or more memory modules to which the memory devices are mounted, such as single inline memory modules (SIMMs), dual inline memory modules (DIMMs), etc.

In various implementations, PLC device or modem 113 may include transmitter and/or receiver circuits configured to connect to power lines 103, 105, and/or 108. FIG. 4 illustrates a connection between the power line communication transmitter and/or receiver circuitry to the power lines according to some embodiments. PLC transmitter/receiver 401 may function as the transmitter and/or receiver circuit. When PLC transmitter/receiver 401 operates as a transmitter, it may generate pre-coded signals for transmission over the power line network. Each output signal, which may be a digital signal, may be provided to a separate line driver circuit 402A-C. Line drivers 402A-C may comprise, for example, digital-to-analog conversion circuitry, filters, and/or line drivers that couple signals from PLC transmitter/receiver 401 to power lines 403A-C. Transformer 404 and coupling capacitor 405 link each analog circuit/line driver 402 to its respective power line 403A-C. Accordingly, in the embodiment illustrated in FIG. 4, each output signal is independently linked to a separate, dedicated power line. Conversely, when PLC transmitter/receiver 401 operates as a receiver, coded signals may be received on power lines 403A-C, respectively. In an embodiment, each of these signals may be individually received through coupling capacitors 405, transformers 404, and line drivers 402 to PLC transmitter/receiver 401 for detection and receiver processing of each signal separately. Alternatively, the received signals may be routed to summing filter 406, which combines all of the received signals into one signal that is routed to PLC transmitter/receiver 401 for receiver processing.

FIG. 5 illustrates an alternative embodiment in which PLC transmitter/receiver 501 is coupled to a single line driver 502, which is in turn coupled to power lines 503A-C by a single transformer 504. All of the output signals are sent through line driver 502 and transformer 504. Switch 506 selects which power line 503A-C receives a particular output signal. Switch 506 may be controlled by PLC transmitter/receiver 501. Alternatively, switch 506 may determine which power line 503A-C should receive a particular signal based upon information, such as a header or other data, in the output signal. Switch 506 links line driver 502 and transformer 504 to the selected power line 503A-C and associated coupling capacitor 505. Switch 506 also may control how received signals are routed to PLC transmitter/receiver 501.

FIG. 6 is similar to FIG. 5 in which PLC transmitter/receiver 1901 is coupled to a single line driver 1902. However, in the embodiment of FIG. 6, power lines 603A-C are each coupled to a separate transformer 604 and coupling capacitor 605. Line driver 602 is coupled to the transformers 604 for each power line 603 via switch 606. Switch 606 selects which transformer 604, coupling capacitor 605, and power line 603A-C receives a particular signal. Switch 606 may be controlled by PLC transmitter/receiver 601, or switch 606 may determine which power line 603A-C should receive a particular signal based upon information, such as a header or other data, in each signal. Switch 606 also may control how received signals are routed to PLC transmitter/receiver 601.

FIG. 7 is a block diagram of nodes in PLC network 700 following the PRIME standard according to some embodiments. As illustrated, root device 705 may be a PLC data concentrator or the like, shown as element 114 in FIG. 1. Switch nodes or devices 710 (e.g., PLC chargers, meters, modems, etc.) may be configured to act as switches and/or routers, thus allowing one or more terminal devices 715 (e.g., other PLC chargers, meters, modems, etc.) to communicate with root device 705 through them. In operation, each of switch devices 710 may transmit periodic beacon messages, packets, or frames across network 700. New node 720 may receive one or more of these beacons, and may select one of switch devices 710 as its parent so that it may register with or join network 700 thorough the selected parent, thus resulting in the "tree topology" shown in FIG. 7. Also, in order to determine which devices are present in network 700, root device 705 may transmit "alive request" messages, packets, or frames, across network 700, and it may receive "alive responses" messages, packets, or frames from those among devices 710 and 715 that are reached by the alive requests.

In various embodiments, different techniques may be used by new node 720 in the process of choosing one of switch devices 710 to attempt to register itself onto network 700 based upon received beacons. These techniques may be implemented, for example, through modifications to the Media Access Control (MAC) protocol. Generally speaking, a MAC protocol is a sub-layer of a data link layer specified in a seven-layer Open Systems Interconnection (OSI) model. Particularly, a MAC protocol may provide addressing and channel access control mechanisms that enable terminals or network nodes (e.g., PLC modems, etc.) to communicate over a shared medium (i.e., a power line). To facilitate communications among the devices described above, each of devices 705-720 may implement a MAC protocol configured to coordinate inter-device communications.

FIG. 8 is a flowchart of method 800 of selecting beacons in a communications network. In some embodiments, method 800 may be performed, at least in part, by device or node 720 shown in FIG. 7 (e.g., a PLC modem). At block 805, method 800 receives one or more beacons (e.g., from one or more of switch devices 710) and stores a list of those beacons (e.g., in a memory). At block 810, method 800 inspects one or more entries in the beacon list, one at a time, in order to rank or sort them in the form of a preference list. At block 815, method 800 includes determining whether a beacon in the list corresponds to one of switch nodes 710 to which node 720 has been previously connected to (e.g., the last connection or communication session). If node 720 is new (or has been reset by an application, for example), there may not be a "previous connection," and therefore method 800 may proceed to block 840.

Conversely, if the beacon under inspection corresponds to a switch node to which node 720 has previously connected to, method 800 may determine the connection time as the time for which the previous connection lasted. In some cases, the connection time may be determined if the connection was eventually lost due to channel conditions (e.g., timeout, beacon loss, etc.). However, if the previous connection was terminated for some other reason (e.g., node 720 was unregistered through a disconnect command or the switch node unregistered itself for some higher layer reasons, etc.) then control may again pass to block 840. At block 820, method 800 may determine whether the connection time is smaller than a first threshold value ("CTmin"). If so, the beacon and/or switch node under inspection may be blacklisted at block 825 such that node 720 will not ordinarily attempt to connect to it further. Otherwise, method 800 may determine whether the connection time is greater than a second threshold value ("CTmax"). If so, an entry corresponding to the beacon under inspection and/or its corresponding switch node may be added to the top of a preference list at block 835. Alternatively, method 800 may select that switch node at block 835 and end.

If the connection time is between CTmin and CTmax, then at block 840 method 800 determines whether a signal quality indicator (e.g., Signal-to-Noise Ratio (SNR)) of the beacon under inspection is greater than a threshold value (e.g., 5 dB). If so, an entry corresponding to the beacon under inspection and/or its corresponding switch node may be added to a first portion of the preference list at block 845. Otherwise, an entry corresponding to the beacon under inspection and/or its corresponding switch node may be added to a second or last portion of the preference list at block 850.

Thus, at the end of method 800, a preference list with entries for each of the received beacons and corresponding switch nodes may have been created. The preference list may be divided into three or more portions (i.e., a top portion, a first portion, and a second or last portion). In some cases, the entries in the first portion of the preference list may be ordered according to their levels (e.g., power level of received beacon signal). The power field in the beacon signal generally indicates the physical distance between nodes (e.g., a high level indicates that a switch node is closer to node 720). Meanwhile, entries in the second portion of the preference list may be ordered according to their signal quality indicators (e.g., SNR). Once the preference list is compiled, node 720 may inspect the list in order (i.e., in this case, top, first, and second portions) to determine the highest ranked entry, and to select its corresponding switch node through which to register with network 700.

As such, node 720 may attempt to use each of the switch nodes in the preference list one by one from top to bottom. If registration fails with any given switch node, that switch node may be blacklisted and the next switch node in the preference list may be used until registration succeeds. Particularly, as long as the received SNR is above a threshold value, method 800 allows node 720 to choose the switch node that is closest to it (e.g., the highest ranked entry in the first portion of the preference list), thus reducing overall network levels and in turn the network traffic. When such a beacon/switch is not available, however, method 800 enables node 720 to choose the switch whose beacon has the highest SNR level (e.g., the highest ranked entry in the second portion of the preference list). Moreover, if a previous connection has been satisfactory (i.e., its connection time is larger than CTmax), then the switch node used in that connection may be used instead. Also, in some cases, if registration fails after maximum attempts, node 720 may transmit a Promotion Needed Protocol Data Unit (PDU) (PNPDU) to determine whether it may choose among a larger pool of switch nodes.

FIG. 9 is a flowchart of another method 900 of selecting beacons in a communications network. Again, in some embodiments, method 900 may be performed, at least in part, by device or node 720 shown in FIG. 7 (e.g., a PLC modem). Generally speaking, method 900 may proceed similarly as method 800 shown in FIG. 8. At block 840, however, if the signal quality indicator of the beacon under inspection is greater than a threshold value at block 840, then a beacon quality index analysis may be undertaken to add entries to n portions of the preference list, as described in more detail below.

Specifically, the "BCN.QLTY" field is available in beacon signals following the PRIME standard to represent the round trip quality of a switch node—that is, the quality of the path from root node 705 to that switch node. In some embodiments, the round trip quality may take into account both in the uplink (i.e., from the switch node to the root node) and downlink (i.e., from the root node to the switch node) directions, and it may be measured in terms of the probability of success for a frame to traverse the end-to-end route between root node 705 and a given switch node. For example, such a metric may be computed, for each switch node, based on "alive frames" as follows:

Probability of Success=(BNA1vRxCnt/SNA1vTxCnt)
*(SNA1vRxCnt/BNA1vTxCnt)

where BNA1vRxCnt is the number of alive responses received by the root node, SNA1vTxCnt is the number of alive responses transmitted by a given switch node, SNA1vRxCnt is the number of alive requests received by the given switch node, and BNA1vTxCnt is the number of a live requests transmitted by the root node. These may each be determined by the switch node, for example, by monitoring the transmit counter ("TXCNT") and receive counter ("RXCNT") fields in the alive messages, and cumulatively tracking the counter(s) to obtain the total number of alive messages sent and received by the root node (e.g., if the switch node receives an alive request with a counter set to 5, followed by another alive request with a counter set to 8, it may infer that alive requests 6 and 7 were not received).

Alternatively, the probability of success may be calculated for the uplink direction only (i.e., from the switch node to the root node) as follows:

Probability of Success=(BNA1vRxCnt/SNA1vTxCnt)

In some cases, a given switch node may keep track of alive counters from the instant it gets registered to the network. Then, the resulting probability values may be mapped to the BCN.QLTY field as a Beacon Quality Index (BQI) or the like. An example to help illustrate this mapping procedure is provided in Table I below:

TABLE I

| Probability Range | BCN Quality Index |
|---|---|
| 0.9-1 | 7 |
| 0.75-0.9 | 6 |
| 0.5-0.75 | 5 |
| 0.25-0.5 | 4 |
| 0.15-0.25 | 3 |
| 0.1-0.15 | 2 |
| 0.05-0.1 | 1 |
| 0-0.05 | 0 |

It should be noted however, that other suitable mapping tables may be used resulting in more or fewer than 8 indexes and/or different probability ranges.

Turning back to FIG. 9, when the Beacon Quality Indexes or BQIs are present in the switch nodes' beacons at block 905, method 900 may evaluate those BQIs at blocks 910-920. For example, at block 910, method 900 determines whether the beacon under inspection has a BQI larger than a first threshold (e.g., BQI≥4). If so, an entry corresponding to the beacon and/or its respective switch node may be added to a first portion of the preferences table at block 915 and ordered by level. Depending upon the number of possible BQIs, there may be a number of blocks between blocks 910 and 920 where a similar BQI analysis in undertaken. Particularly, between blocks 910 and block 920, method 900 determines whether the beacon under inspection has a BQI equal to a sequence of thresholds n (e.g., n=3, 2, and 1) and, if so, it stores an entry corresponding to the beacon and/or its respective switch node to an $n^{th}$ portion of the preferences table at block 925 and orders it among other entries in that same portion by level. For example, if the BQI is equal to 3, the beacon and/or its respective switch node may be added to a second portion of the preferences table. If the BQI is equal to 2, the beacon and/or its respective switch node may be added to a third portion of the preferences table. And if the BQI is equal to 1, the beacon and/or its respective switch node may be added to a fourth portion of the preferences table.

In some embodiments, if the beacon under inspection has a BQI lower than the lowest threshold value provided for in block 920, then method 900 may still store an entry corresponding to the beacon and/or its respective switch node to a next-to-last portion of the preferences table at block 925. Again, in the preceding example, each of the first, second, third, fourth, and fifth portions of the preference list may have their respective entries ordered by level and independently of the other portions.

Similarly as in FIG. 8, here node 720 may attempt to use each of the switch nodes in the preference list one by one from top to bottom. In the previous example, the preference list may be scanned starting at the top portion (i.e., if the connection time meets CTmax), then the first portion (BQI≥4), followed by the second portion (BQI=3), the third portion (BQI=2), the fourth portion (BQI=1), the fifth portion (BQI≤1), and the last portion (SNR<threshold). If registration fails with any given switch node, then that switch node may be blacklisted and the next switch node in the preference list may be used until registration succeeds. And, if registration fails after maximum attempts, node 720 may transmit a PNPDU to determine whether it may choose among a larger pool of switch nodes. Blacklisted switches may be cleared for future connection attempts, for instance, after a PNPDU timeout (e.g., 5 minutes) or if a new beacon is received and the PNDPU transmission is stopped.

It should be noted that, although some of the examples described above make use a "preference list," in some cases such a list may not be used. For instance, an algorithm may compare two received beacons at a time (e.g., as they arrive) and select the best beacon between the two. The process may be repeated with a third, newly arriving beacon, thus potentially resulting in a new "best" beacon and so on. Therefore, as a person of ordinary skill in the art will recognize in light of this disclosure, there may be other suitable ways to perform beacon selection without maintaining a preference list.

In certain embodiments, one or more of the techniques described above may be executed, at least in part, by one or more communication devices and/or computer systems. One such computer system is illustrated in FIG. 10. In various embodiments, system 1000 may be implemented as a communication device, modem, data concentrator, server, a mainframe computer system, a workstation, a network computer, a desktop computer, a laptop, mobile device, or the like. In different embodiments, these various systems may be configured to communicate with each other in any suitable way, such as, for example, via a local area network or the like.

As illustrated, system 1000 includes one or more processors 1010 coupled to a system memory 1020 via an input/output (I/O) interface 1030. Computer system 1000 further includes a network interface 1040 coupled to I/O interface 1030, and one or more input/output devices 1025, such as cursor control device 1060, keyboard 1070, display(s) 1080, and/or mobile device 1090. In various embodiments, computer system 1000 may be a single-processor system including one processor 1010, or a multi-processor system including two or more processors 1010 (e.g., two, four, eight, or another suitable number). Processors 1010 may be any processor capable of executing program instructions. For example, in various embodiments, processors 1010 may be general-purpose or embedded processors implementing any of a variety of instruction set architectures (ISAs), such as the x86, POWERPC®, ARM®, SPARC®, or MIPS® ISAs, or any other suitable ISA. In multi-processor systems, each of processors 1010 may commonly, but not necessarily, implement the same ISA. Also, in some embodiments, at least one processor 1010 may be a graphics processing unit (GPU) or other dedicated graphics-rendering device.

System memory 1020 may be configured to store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. As illustrated, program instructions and data implementing certain operations such as, for example, those described in the figures above, may be stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a computer-accessible medium may include any tangible storage media or memory media such as magnetic or optical media—e.g., disk or CD/DVD-ROM coupled to computer system 1000 via I/O interface 1030. Program instructions and data stored on a tangible computer-accessible medium in non-transitory form may further be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may be configured to coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, mobile devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

As shown in FIG. 10, memory 1020 may include program instructions 1025, configured to implement certain embodiments described herein, and data storage 1035, comprising various data accessible by program instructions 1025. In an embodiment, program instructions 1025 may include software elements of embodiments illustrated in the above figures. For example, program instructions 1025 may be implemented in various embodiments using any desired programming language, scripting language, or combination of programming languages and/or scripting languages (e.g., C, C++, C#, JAVA®, JAVASCRIPT®, PERL®, etc.). Data storage 1035 may include data that may be used in these embodiments (e.g., recorded communications, profiles for different modes of operations, etc.). In other embodiments, other or different software elements and data may be included.

A person of ordinary skill in the art will appreciate that computer system 1000 is merely illustrative and is not intended to limit the scope of the disclosure described herein. In particular, the computer system and devices may include any combination of hardware or software that can perform the indicated operations. In addition, the operations performed by the illustrated components may, in some embodiments, be performed by fewer components or distributed across additional components. Similarly, in other embodiments, the operations of some of the illustrated components may not be provided and/or other additional operations may be available. Accordingly, systems and methods described herein may be implemented or executed with other computer system configurations.

It will be understood that various operations discussed herein may be executed simultaneously and/or sequentially. It will be further understood that each operation may be performed in any order and may be performed once or repetitiously. In various embodiments, the operations discussed herein may represent sets of software routines, logic functions, and/or data structures that are configured to perform specified operations. Although certain operations may be shown as distinct logical blocks, in some embodiments at least some of these operations may be combined into fewer blocks. Conversely, any given one of the blocks shown herein may be implemented such that its operations may be divided among two or more logical blocks. Moreover, although shown with a particular configuration, in other embodiments these various modules may be rearranged in other suitable ways.

Many of the operations described herein may be implemented in hardware, software, and/or firmware, and/or any combination thereof. When implemented in software, code segments perform the necessary tasks or operations. The program or code segments may be stored in a processor-readable, computer-readable, or machine-readable medium. The processor-readable, computer-readable, or machine-readable medium may include any device or medium that can store or transfer information. Examples of such a processor-readable medium include an electronic circuit, a semiconductor memory device, a flash memory, a ROM, an erasable ROM (EROM), a floppy diskette, a compact disk, an optical disk, a hard disk, a fiber optic medium, etc. Software code segments may be stored in any volatile or non-volatile storage device, such as a hard drive, flash memory, solid state memory, optical disk, CD, DVD, computer program product, or other memory device, that provides tangible computer-readable or machine-readable storage for a processor or a middleware container service. In other embodiments, the memory may be a virtualization of several physical storage devices, wherein the physical storage devices are of the same or different kinds. The code segments may be downloaded or transferred from storage to a processor or container via an internal bus, another computer network, such as the Internet or an intranet, or via other wired or wireless networks.

Many modifications and other embodiments of the invention(s) will come to mind to one skilled in the art to which the invention(s) pertain having the benefit of the teachings presented in the foregoing descriptions, and the associated drawings. Therefore, it is to be understood that the invention(s) are not to be limited to the specific embodiments disclosed. Although specific terms are employed herein, they are used in a generic and descriptive sense only and not for purposes of limitation.

The invention claimed is:

1. A method comprising:
performing, using a terminal device deployed in a communications network,
receiving a beacon transmitted by a switch device within in the communications network;
in response to the terminal device having had a previous connection with the switch device, determining a connection time of the previous connection;
adding the switch device to a blacklist in response to the connection time being smaller than a first threshold value or selecting the switch device for subsequent communication in response to the connection time being greater than a second threshold value;
determining a signal quality indicator of the beacon in response to the connection time being between the first and second threshold values; and
storing an entry corresponding to the beacon in a first portion of a preferences list in response to the signal quality indicator being greater than a signal quality threshold value or storing an entry corresponding to the beacon in a second portion of the preferences list in response to the signal quality indicator being smaller than the signal quality threshold value.

2. The method of claim 1, wherein the communications network is a Power Line Communications (PLC) network.

3. The method of claim 1, further comprising:
performing, using the terminal device,
determining that the previous connection was terminated due to channel conditions.

4. The method of claim 3, wherein the channel conditions include a loss of beacon event or a timeout event.

5. The method of claim 1, wherein the signal quality indicator is a Signal-to-Noise (SNR) ratio.

6. The method of claim 1, wherein the first portion of the preferences list includes a plurality of entries corresponding to other beacons transmitted by other switch devices within the communications network, the plurality of entries ordered according to their respective beacon's signal level.

7. The method of claim 1, wherein the first portion of the preferences list includes a plurality of entries corresponding to other beacons transmitted by other switch devices within the communications network, the plurality of entries ordered according to a received signal strength of the beacon between the terminal device and each switch device corresponding to a respective entry.

8. The method of claim 1, wherein the second portion of the preferences list includes a plurality of entries corresponding to other beacons transmitted by other switch devices within the communications network, the plurality of entries ordered by their respective beacon's signal quality indicators.

9. The method of claim 1, further comprising:
performing, using the terminal device:
selecting one of a plurality of switch devices for a subsequent communication based upon a plurality of ordered entries in the first portion of the preferences list or selecting one of a plurality of switch devices for a subsequent communication based upon a plurality of ordered entries in the second portion of the preferences list in response to no entries being stored in the first portion of the preferences list.

10. A method comprising:
performing, using a terminal device deployed in a communications network,
receiving a beacon transmitted by a switch device within in the communications network;
in response to the terminal device having had a previous connection with the switch device, determining a connection time of the previous connection;
adding the switch device to a blacklist in response to the connection time being smaller than a first threshold value or selecting the switch device for subsequent communication in response to the connection time being greater than a second threshold value;
determining a signal quality indicator of the beacon in response to the connection time being between the first and second threshold values; and
storing an entry corresponding to the beacon in a first plurality of entries in a last portion of a preferences list in response to the signal quality indicator being smaller than a signal quality threshold value, each of the last plurality of entries in the last portion of the preferences list ordered by their respective signal quality indicators, or determining a beacon quality index for the beacon and storing an entry corresponding to the beacon in an $n^{th}$ plurality of entries in an $n^{th}$ portion of the preferences list in response to the beacon quality index being greater than or equal to an $n^{th}$ predetermined value, each of the n portions of the preferences list having their respective entries from the $n^{th}$ plurality of entries ordered by their respective signal levels, wherein n is an integer greater than 1.

11. The method of claim 10, wherein determining the beacon quality index includes determining an end-to-end probability of success in communications between the terminal device and the switch device, and mapping a calculated end-to-end probability of success to one of a plurality of possible beacon quality indexes.

12. The method of claim 10, further comprising:
performing, using the terminal device,
selecting one of a plurality of switch devices for a subsequent communication by sequentially inspecting one or more of the portions of the preferences list.

13. A system, comprising:
a communications device having a processor and a memory coupled to the processor, the memory configured to store program instructions executable by the processor to cause the communications device to:
identify a beacon associated with a switch node in a communications network;
in response to the communications device having had a previous connection with the switch node, determine a connection time of the previous connection;
determine a signal quality indicator of the beacon in response to the connection time being between a first threshold value and a second threshold value;
store an entry corresponding to the beacon in a first portion of a preferences list in response to the signal quality indicator being greater than a signal quality threshold value; and
store an entry corresponding to the beacon in a second portion of the preferences list in response to the signal quality indicator being smaller than the signal quality threshold value.

14. The system of claim 13, wherein the signal quality indicator is a Signal-to-Noise (SNR) ratio.

15. The system of claim 14, wherein the first portion of the preferences list includes a first plurality of entries corresponding to other beacons transmitted by other switch nodes, the first plurality of entries ordered according to their respective beacon's signal level, and wherein the second portion of the preferences list includes a second plurality of entries corresponding to other beacons transmitted by other switch nodes, the second plurality of entries ordered by their respective beacon's signal quality indicators.

16. The system of claim 15, the program instructions further executable by the processor to cause the communications device to select one of a plurality of switch nodes for a subsequent communication based upon the first plurality of entries in the first portion of the preferences list, if any, followed by the second plurality of entries in the second portion of the preferences list if no entries are stored in the first portion of the preferences list.

17. A non-transitory electronic storage medium having program instructions stored thereon that, upon execution by a processor within a communications device, cause the communications device to:
identify a beacon associated with a switch node in a communications network;
in response to the communications device having had a previous connection with the switch node, determine a connection time of the previous connection;
determine a signal quality indicator of the beacon in response to the connection time being between a first threshold value and a second threshold value;
store an entry corresponding to the beacon in a plurality of entries in a last portion of a preferences list in response to the signal quality indicator being smaller than a signal quality threshold value, each of the plurality of entries in the last portion of the preferences list ordered by their respective signal quality indicators; and
determine a beacon quality index for the beacon and storing an entry corresponding to the beacon in an $n^{th}$ portion of the preferences list in response to the beacon quality index being greater than or equal to an $n^{th}$ predetermined value, each of the n portions of the preferences list having their plurality of entries ordered by their respective signal levels, wherein n is an integer greater than 1.

18. The electronic storage medium of claim 17, wherein to determine the beacon quality index, the program instructions, upon execution by the processor, further cause the communications device to determine an end-to-end probability of success in communications between the communications device and the switch device, and mapping a calculated end-to-end probability of success to one of a plurality of possible beacon quality indexes.

19. The electronic storage medium of claim 18, wherein the program instructions, upon execution by the processor, further cause the communications device to select one of a plurality of switch devices for a subsequent communication by sequentially inspecting one or more of the n+1 portions of the preferences list in order.

\* \* \* \* \*